(12) United States Patent
Chang et al.

(10) Patent No.: US 9,304,678 B2
(45) Date of Patent: Apr. 5, 2016

(54) SWITCHING METHOD FOR ELECTRONIC DEVICE

(75) Inventors: Chih-Chiang Chang, Taipei (TW); Chih-Hao Chen, Taipei (TW); Han-Chang Lin, Taipei (TW); Cho-Yi Lin, Taipei (TW)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 224 days.

(21) Appl. No.: 13/536,645

(22) Filed: Jun. 28, 2012

(65) Prior Publication Data

US 2013/0194206 A1   Aug. 1, 2013

(30) Foreign Application Priority Data

Feb. 1, 2012   (TW) .............................. 101103308 A

(51) Int. Cl.
*G06F 3/0488*   (2013.01)
(52) U.S. Cl.
CPC .................................. *G06F 3/04883* (2013.01)
(58) Field of Classification Search
CPC ................... G06F 2203/04808; G06F 3/04886
USPC ............. 345/156, 173–179; 310/328; 710/14; 455/411
See application file for complete search history.

(56) References Cited

U.S. PATENT DOCUMENTS

| 2002/0058527 | A1 | 5/2002 | Kawasaki et al. | |
| 2006/0197750 | A1* | 9/2006 | Kerr et al. | 345/173 |
| 2007/0152966 | A1* | 7/2007 | Krah et al. | 345/163 |
| 2007/0156364 | A1* | 7/2007 | Rothkopf | 702/117 |
| 2009/0083847 | A1* | 3/2009 | Fadell et al. | 726/16 |
| 2009/0199130 | A1* | 8/2009 | Tsern et al. | 715/810 |
| 2011/0256848 | A1* | 10/2011 | Bok et al. | 455/411 |

FOREIGN PATENT DOCUMENTS

TW             346296 I        8/2011

OTHER PUBLICATIONS

Office Action and Search Report; Taiwanese Patent Application No. 101103308; Jun. 30, 2014; Taiwan Intellectual Property Office; Taipei, Taiwan.
Second Office Action; Taiwanese Patent Application No. 101103308; Nov. 24, 2014; Taiwan Intellectual Property Office; Taipei, Taiwan.
Search Report; Taiwanese Patent Application No. 101103308; Oct. 28, 2014; Taiwan Intellectual Property Office; Taipei, Taiwan.

* cited by examiner

*Primary Examiner* — Alexander Eisen
*Assistant Examiner* — Cory Almeida
(74) *Attorney, Agent, or Firm* — Winston Hsu; Scott Margo

(57) ABSTRACT

A switching method for an electronic device having sensing regions is mentioned. The switching method is configured to detect signals received by the electronic device, so as to switch the states of the electronic device. The switching method comprises receiving a first signal at a first moment and receiving a second signal at a second moment, wherein the first signal is generated by touching a first sensing region and the second signal is generated by touching a second sensing region; measuring a triggering duration and determining whether the triggering duration is consistent with a predetermined duration, when the first signal and the second signal are inputted simultaneously; switching the electronic device from a first state to a second state, if the triggering duration is consistent with the predetermined duration; and maintaining the electronic device in the first state, if the triggering duration is not consistent with the predetermined duration.

6 Claims, 14 Drawing Sheets

SWITCHING METHOD FOR ELECTRONIC DEVICE

CROSS-REFERENCE TO RELATED APPLICATIONS

This non-provisional application claims priority under 35 U.S.C. §119(a) on Patent Application No. 101103308 filed in Taiwan, R.O.C. on Feb. 1, 2012, the entire contents of which are hereby incorporated by reference.

BACKGROUND

1. Technical Field

The disclosure relates to a controlling method for electronic devices, and more particularly to a state-switching method for mobile devices.

2. Related Art

With the rise of the smart phone, more and more smart phones are used for work and entertainment. Generally, the touch display panel is applied to the smart phone, for inputting information and viewing the documents. With the touch display panel, not only the displaying area of the mobile phone is enlarged, but also touch display panel function as an inputting interface. The touch display panel can be classified into resistive touch display panel and capacitive touch display panel. With respect to the resistive touch display panel, the position pressed is obtained by sensing the alteration of the resistance caused by the pressing on the screen. For the capacitive touch display panel, the position pressed is obtained by sensing the induction between the touch screen and the body static electricity.

Although there are several advantages, the touch display panel has following problems. If the user accidentally touches the screen, the smart phone will perform improper operations that the user does not want. For example, when the user accidentally touches the button for calling, the smart phone will perform the dialing operation directly. For avoiding the improper operations, most smart phones have a locked state. In the locked state, even if the panel is touched accidentally, the smart phone can not perform the corresponding operation. In this state, the locked state can be unlocked by for example, inputting the pass words.

Although the locked state ensures that the function corresponding to an accidental touch will not be performed, the user is required to set and remember the passwords. Therefore, unlocking the conventional smart phone in the locked state by inputting passwords is inconvenient. Furthermore, the user can not perform the unlock operation if the touch display panel is out of order.

SUMMARY

The present disclosure provides the disclosure provides a switching method for an electronic device having a plurality of sensing regions. The switching method is configured to detect signals received by the electronic device and to switch the states of the electronic device. The switching method comprises following steps. A first signal is received at a first moment, and receiving a second signal is received at a second moment, wherein the first signal is generated by touching a first sensing region and the second signal is generated by touching a second sensing region. A triggering duration is measured, and whether the triggering duration is consistent with a predetermined duration is determined, when the first signal and the second signal are inputted simultaneously. If the triggering duration is consistent with the predetermined duration, the electronic device is switched from a first state to a second state. If the triggering duration is not consistent with the predetermined duration, the electronic device is maintained in the first state.

The present disclosure further provides another switching method for an electronic device having a plurality of sensing regions. The switching method is configured to switch the states of the electronic device and comprises following steps. A first signal is generated by touching a first sensing region, when the electronic device is in a first state. A second signal generated in a second sensing is received, during a period in which the first signal is received. Whether a touching manner and a moving path of the second signal are consistent with a predetermined gesture is determined. If the second signal is consistent with the predetermined gesture, the electronic device is switched from a first state to a second state. If the second signal is not consistent with the predetermined gesture, the electronic device is maintained in the first state.

The present disclosure further provides another switching method for an electronic device. The switching method is capable of switching states of the electronic device and comprises following steps. A first signal is capable of being generated by touching a sensing region, when the electronic device is in a first state. Whether a triggering duration exceeds or equals the predetermined duration is determined. If the triggering duration exceeds or equals to the predetermined duration, the electronic device is switched from a first state to a second state. If the triggering duration is shorter than the predetermined duration, the electronic device is maintained in the first state.

The present disclosure further provides another switching method for an electronic device. The switching method is configured to switch states of the electronic device and comprises following steps. When the electronic device is in a first state, a first signal is generated by touching a sensing region. Whether a touching manner and a moving path of the first signal are consistent with a predetermined gesture is determined. If the first signal is consistent with the predetermined gesture, the electronic device is switched from a first state to a second state. If the first signal is not consistent with the predetermined gesture, the electronic device is maintained in the first state.

The present disclosure further provides another method for an electronic device having a plurality of sensing regions. The switching method is capable of switching states of the electronic device and comprises following steps. A first signal generated by touching a first sensing region is received at a first moment, and the second signal generated by touching a second sensing region is received at a second moment. If a triggering duration is consistent with a predetermined duration, a detecting unit is triggered, so as to switch the electronic device from the first state to the second state by the state-switching signal, wherein the first and second signals are received simultaneously in the triggering duration.

The present disclosure further provides an electronic device comprising a first sensing region, a second sensing region and at least one processing unit. The first sensing region is configured to generate a first signal when the first sensing region is touched. The second sensing region is configured to generate a second signal when the second sensing region is touched. The at least one processing unit is electrically connected to the first sensing region and the second sensing region, and the processing unit is configured to determine whether to switch the electronic device from a first state to a second state according to a first signal and a second signal. When the processing unit is in the first state, the processing unit is configured to receive the first signal generated from the first region and the second signal generated from the second region and is configured to determine if the touching manner and the path of the second signal are consistent with a predetermined motion. If the second signal is consistent with the predetermined motion, the electronic device is switched from the first state to the second state.

BRIEF DESCRIPTION OF THE DRAWINGS

The present disclosure will become more fully understood from the detailed description given herein below for illustration only, and thus are not limitative of the present disclosure, and wherein:

FIG. 1B-2 shows a first sensing region and a second sensing region according to another embodiment of the present disclosure;

FIG. 3C-1 and FIG. 3C-2 illustrate an animation presenting the repeated touching-clicking according to the second embodiment of the present disclosure;

FIG. 5B-1 to FIG. 5B-4 illustrate an animation presenting the repeated touching-clicking according to the fourth embodiment of the present disclosure;

FIG. 6C-1 to FIG. 6D-2 illustrate the switching processes according to the fifth embodiment of the present disclosure.

DETAILED DESCRIPTION

Figure 1A:
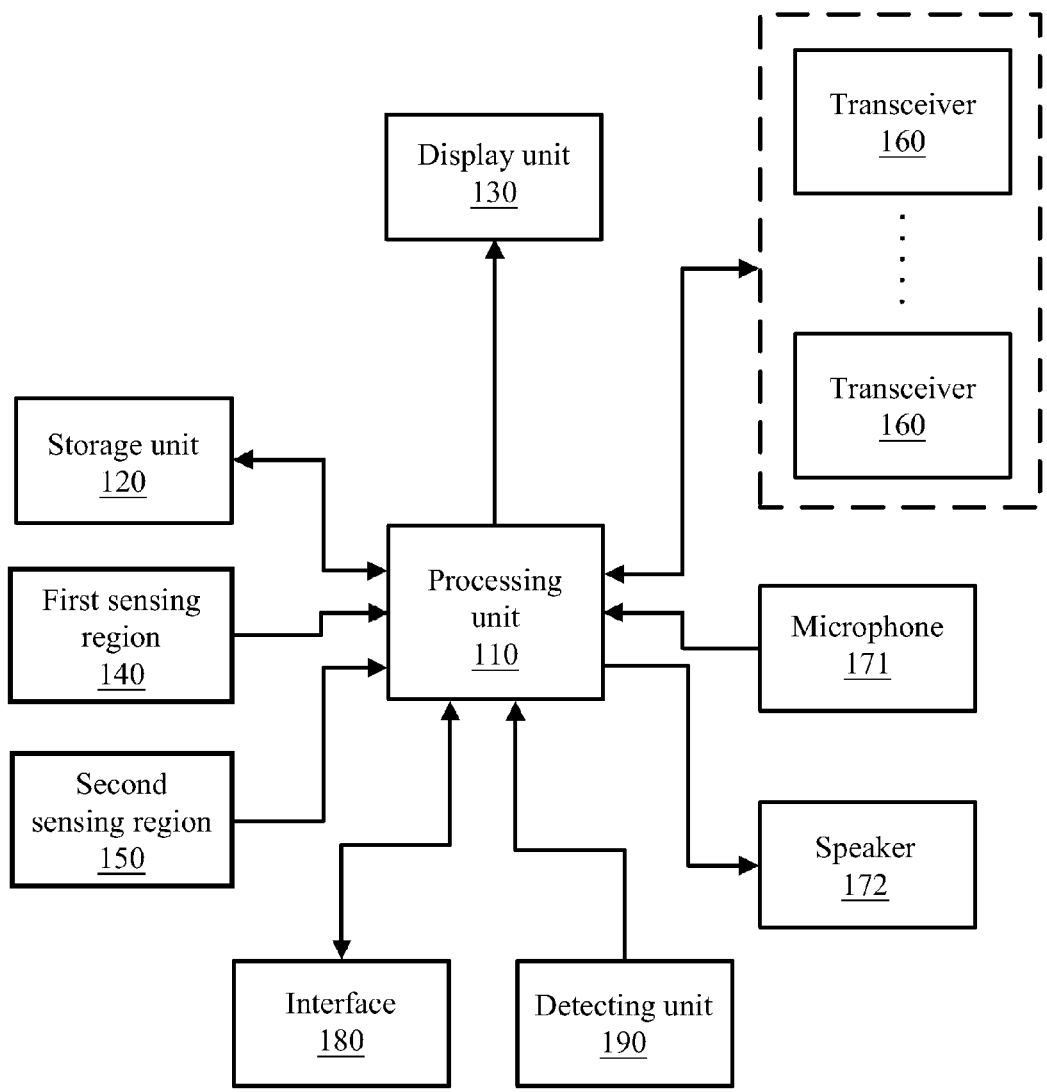
FIG. 1A is a structural diagram of the electronic device according to a first embodiment of the present disclosure.

The switching method in the present disclosure is, for example, applied to mobile phones, tablet PCs, notebooks, media players, PDAs (Personal Digital Assistant) or the combination of the devices as mentioned above, and all of these device are referred to as "electronic device 100" in the present disclosure. FIG. 1A is a structural diagram of the electronic device 100 according to the first embodiment of the present disclosure, the electronic device 100 includes a processing unit 110, a storage unit 120, a display unit 130, a first sensing region 140 and a second sensing region 150. In addition to the elements mentioned above, it is optional for the electronic device 100 to further include transceiver 160, a microphone 171, a speaker 172, an interface 180, a detecting unit 190 or the combination thereof.

The processing unit 110 is electrically connected to the storage unit 120, the display unit 130, each of the transceivers 160, the microphone 171, the speaker 172, the interface 180, the detecting unit 190, the first sensing region 140 and the second sensing region 150. The storage unit 120 is a flash memory, a ROM, a RAM, a hard disk or any combination of thereof. In addition to storing a state-switching program, the storage unit 120 stores an operating system and programs for the electronic device 100, such as a media player program, a web browser program, an address book program, a notebook program or the combination thereof. The processing unit 110 is configured to access and perform the related programs stored in the storage unit 120.

The display unit 130 is configured to display operating states of the electronic device 100 or the result from the programs mentioned above. The display unit 130 is also configured to display indications for operations. For example, when a media player process is implemented by the processing unit 110, the display unit 130 displays a picture standing for the media player and the percentage of a media file which has being displayed. In another example, when a telephone-calling program is implemented by the processing unit 110, the display unit 130 displays the functional keys for calling. The display unit 130 is Liquid Crystal Display (LCD), Laser Phosphor Display (LPD) or other display device. Furthermore, the display unit 130 can adopt various touch-sensing technologies, such as capacitance-sensing, resistance-sensing, infrared-sensing or ultrasonic-sensing. Accordingly, the display unit 130 is capable of receiving input instructions.

The transceivers 160 are configured to receive radio signals. The number of the transceivers varies with the type of the electronic device 100. In other words, the electronic device 100 includes transceivers 160 of the same type or different types. The transceivers 160 conform to IEEE 802.1, so that the electronic device 100 merely supports the Wi-Fi protocol. The transceivers 160 conform to the 3G (3rd-generation) and Wi-Max protocols, so that the electronic device 100 supports both the 3G protocol and the Wi-Max protocol. The transceivers 160 which supports the 3G communication may further include subscriber identity module (SIM), decoding unit, register or other elements. In some embodiments, the decoding unit adopts standard, such as GSM (global system for mobile communications), EDGE (Enhanced Data Rate for GSM Evolution), WCDMA (Wide band Code Division Multiple Access), CDMA (Code Division Multiple Access) or TDMA (Time Division Multiple Access). In other words, according to the communication protocols applied, corresponding type of the transceiver 160 is employed.

The microphone 171 of the electronic device 100 is configured to receive audio signals outside the electronic device 100. An audio conversion circuit of the electronic device 100 is adapted to convert the audio signals into electrical signals. Then, the processing unit 110 is configured to take the subsequent processes, according to the converted electrical signals. In some embodiments, the processing unit 110 is configured to convert electrical signals into analog signals by an audio circuit. The speaker 172 is configured to output sounds corresponding to the analog signals. In some embodiments, besides the built-in speaker 172, either the microphone 171 or the speaker 172 is connected to the electronic device through an interface 180.

In this disclosure, the interface 180 is not limited to be connected to the microphone 171 or headset as mentioned above. In some embodiments, the interface is connected to other devices. In other words, the electronic device 100 may be connected to other devices through the interface 180, and the type of the interface 180 varies with the type of the device to be connected. For example, the electronic device 100 may be connected to a computer through USB (Universal Serial Bus). In some embodiments, the type of the interface 180 may be (or further include) the fire wire (known as IEEE 1394) or other kind of interface.

Figures 1, 1B:
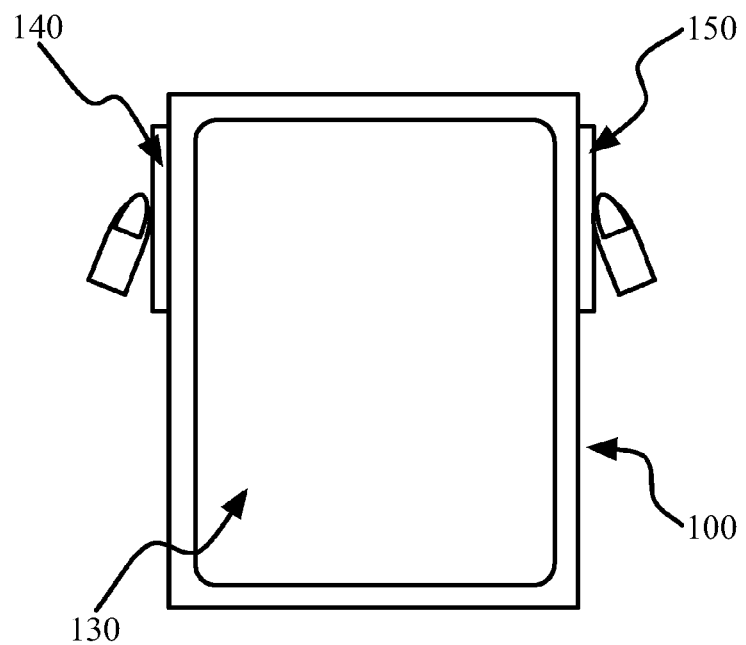
FIG. 1B-1 shows a first sensing region and a second sensing region according to the first embodiment of the present disclosure.
Figures 1, 1B, 2:
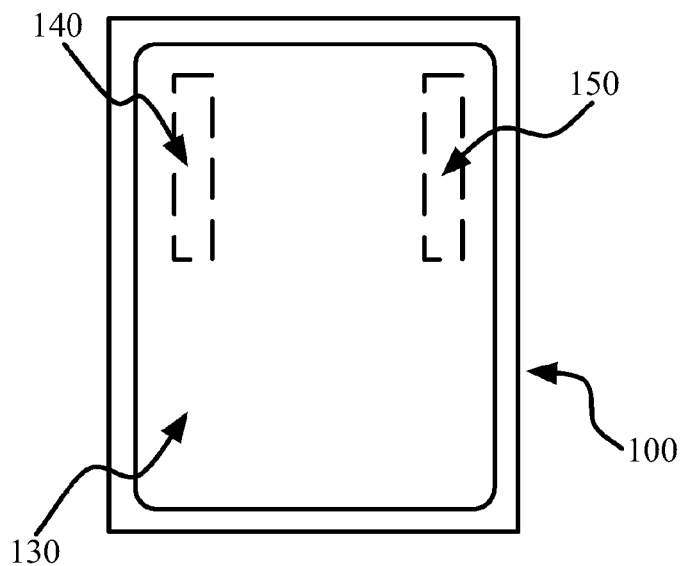

The detecting unit 190 is electrically connected to the processing unit 110. In the present disclosure, the detecting unit 190 is, but is not limited to, button switches, optical sensors, a microphone or an accelerator. The position of the detecting unit 190 varies with the type of the detecting unit 190 and will be described hereinafter. The detecting unit 190 is configured to detect the physical status of the electronic device 100, and then to determine whether to output the signals according to the change of the physical status of the electronic device 100. Refer to FIG. 1B-1 where the first sensing region 140 and the second sensing region 150 are respectively disposed at the opposite sides of the electronic device 100. For clearly showing the two sensing regions, the two sensing regions shown in this figure protrude from the electronic device. In some embodiments, the two sensing regions and the side surfaces are coplanar or the two sensing regions are recessed with respect to the sides of the electronic device 100. Except for the configuration shown in FIG. 1B-1, the first sensing region 140 and the second sensing region 150 may be disposed on the same side of the electronic device 100, as shown in FIG. 1B-2. Refer to FIG. 1B-2 where the first sensing region 140 and the second sensing region 150 marked with dashed frames, are disposed on the same side, i.e., the back side of the electronic device 100. In some embodiments, the first sensing region 140 is disposed on one side of the electronic device 100, the second sensing region 150 is disposed on another side of the electronic device 100. The first sensing region 140 and the second sensing region 150 adopt capacitance sensing, resistance sensing, optical sensing or other sensing technology. For ease of explaining the sensing regions, the first sensing region 140 and the second sensing region 150 are, for example, touch-sensing regions in the present disclosure. In some embodiments, the sensing regions adopt other touch-controlling technologies (such as, press sensing or shadow sensing).

In the present disclosure, the first sensing region 140 and the second sensing region 150 are defined by which sensing region is touched first. The sensing region touched firstly is defined as the first sensing region 140, while the sensing region touched secondly is defined as the second sensing region 150. When the electronic device 100 is held in single hand, the sensing regions may be touched by the different fingers respectively. When the electronic device 100 is held by two hands, the sensing regions may be touched by the hands respectively. When the first sensing region 140 is touched, the first sensing region 140 outputs a first signal. In this touching process, the user may touch the first sensing region 140 without leaving it for a period, or move fingers in the first sensing region 140, or take a series of actions including clicking the first sensing region 140 continuously. By the same way, the second sensing region 150 is configured to output a second signal according to the actions of the fingers.

For ease of explaining the operation of the electronic device, a mobile phone is taken as an example of the electronic device 100. Generally, the states of the mobile phone at least include operating state, locked state, unlocked state and sleep state. In the operating state, the electronic device 100 is configured to processing the programs. Specifically, in the operating state, the processing unit 110 is capable of processing the programs based on the instructions received. For avoiding the incorrect operations caused by the accidental touching, the mobile phone goes into the locked state. Contrast to the operating state, in the locked state, the mobile phone blocks the majority of input signals, for avoiding the unwanted operations caused by the accidental touching. In other words, in the locked state, the mobile phone merely receives special signals (described hereinafter). In the locked state, the processing unit 110 is configured to perform the preset programs, for example, a program accessing the packages on the Internet.

In the sleep state, the processing unit 110 configured to stop/pause the majority of applications and to store the value indicating the state of the electronic device 100 into a register. Similar with the locked state, the processing unit 110 in the sleep state merely receives some special signals. The processing unit 110 does not perform other applications in the sleep state so the sleep state contributes to energy saving. For switching the sleep state or the locked state to the operating state, a state-switching program is provided for the electronic device 100.

Figure 2A:
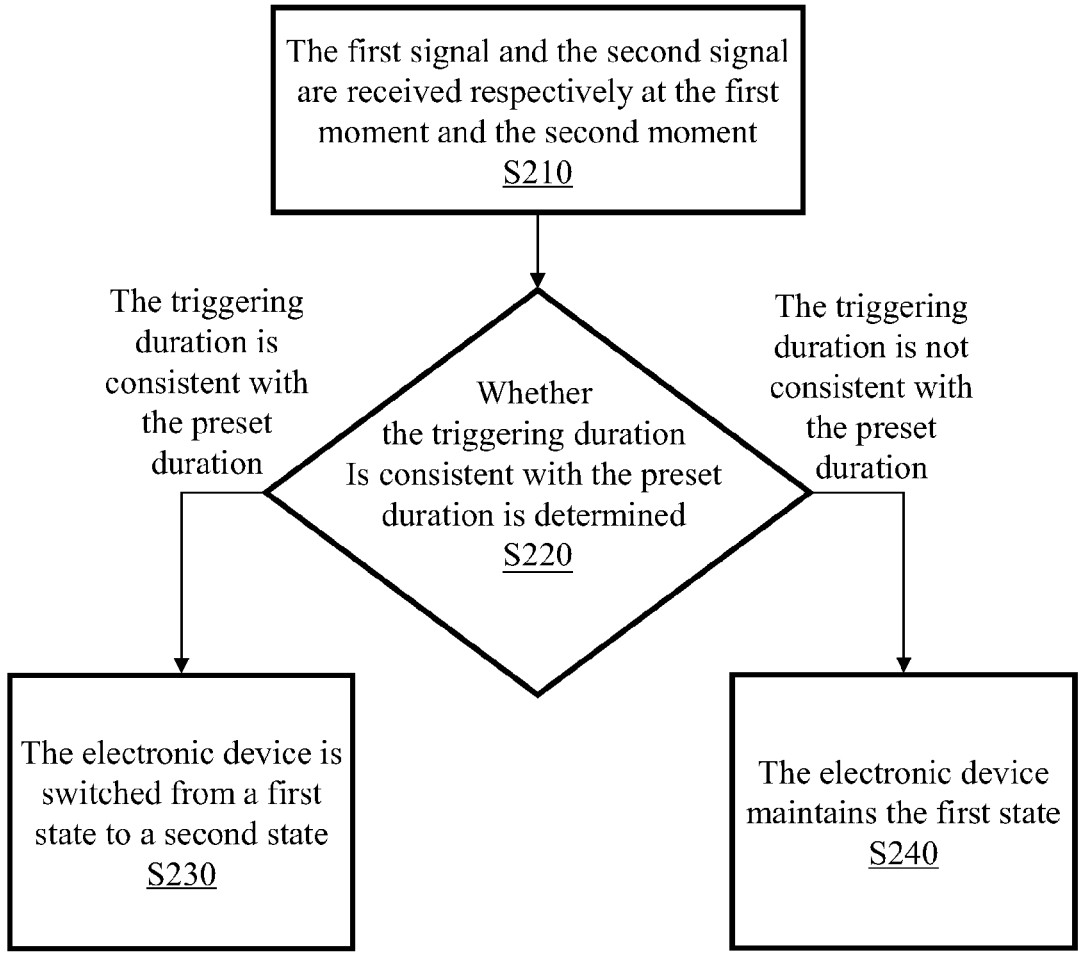
FIG. 2A is a flow chart of the switching method according to the first embodiment of the present disclosure.
Figure 2B:
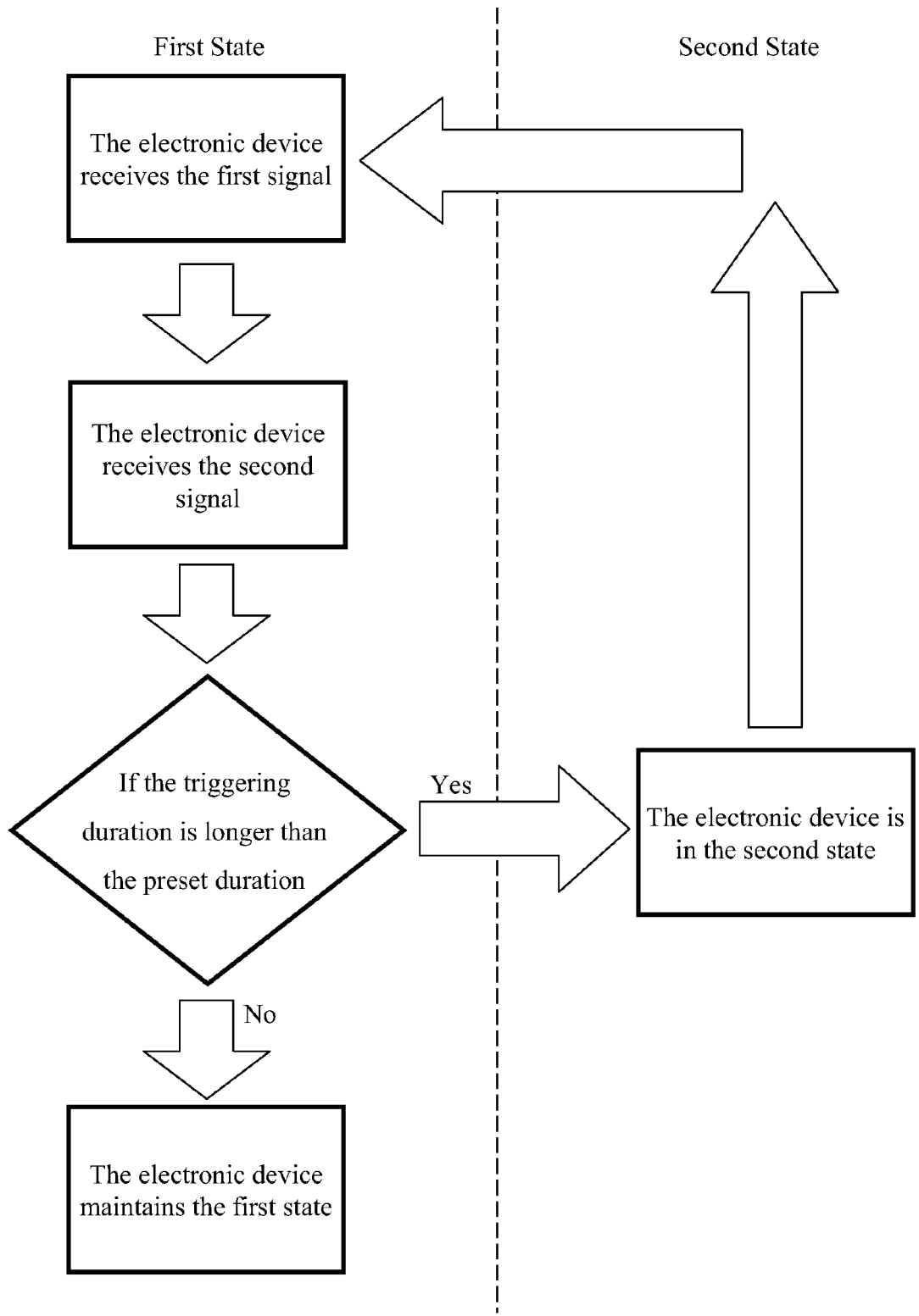
FIG. 2B shows the switching processes according to the first embodiment of the present disclosure.

In the unlocked mode, the electronic device 100 is configured to be switched from the locked state (or the sleep state) to the operating state. Specifically, in the locked state, the input signal is detected, so as to determine whether unlocking process will be performed or not. FIGS. 2A-2B are the flow charts of the switching method according to the first embodiment of the present disclosure, the switching method includes following steps. In Step S210, the first signal and the second signal are received respectively at the first moment and the second moment. In step S220, whether the triggering duration determined by measuring the first and second signals is consistent with a predetermined duration is determined. In step S230, if the triggering duration is consistent with the predetermined duration, the electronic device is switched from a first state to a second state. In step S240, if the triggering duration is not consistent with the predetermined duration, the electronic device maintains the first state.

Figure 2C:
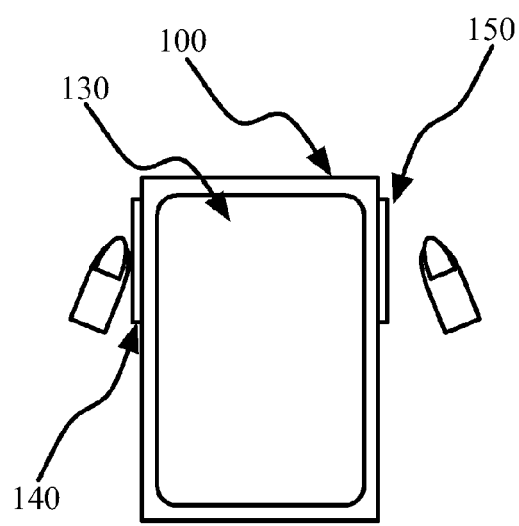
FIGS. 2C-2D shows the first moment and the second moment in the switching method according to the first embodiment of the present disclosure.
Figure 2D:
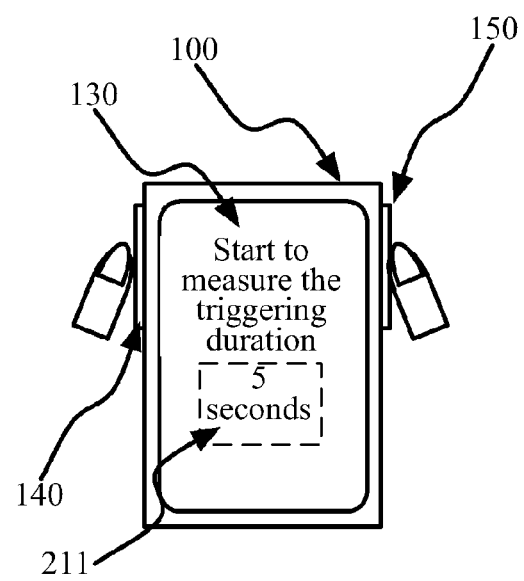

In this disclosure, the sleep state or the locked state is, for example, the first state, and the unlocked state is, for example, the second state. The first signal sent from the first sensing region 140 is received at the first moment (as shown in FIGS. 2B and 2C), and the second signal sent from the second sensing region 150 is received at the second moment (as shown in FIGS. 2B and 2D). The first moment is prior to or equal to the second moment. The processing unit 110 is configured to detect whether both of the first and second signals are inputted simultaneously. When the second signal is inputted, the display unit 130 is configured to display an indication 211 for indicating that the signals are received, for example, the countdown indication. The combination of the first signal and the second signal is considered as the special signals mentioned above. The period in which the first signal and the second signal exist, is defined as the triggering duration. When the two signals received are inputted, the processing unit 110 determines whether the triggering duration is longer than the predetermined duration, for example 5 seconds, as shown in FIG. 2D.

The triggering duration exceeding the predetermined duration indicates that the electronic device 100 is not accidentally touched. Then, the processing unit 110 is switched from the first state to the predetermined state (as shown in FIG. 2B). In the other hand, if the triggering duration does not exceed the predetermined duration, the electronic device 100 will stay in the first state (as shown in FIG. 2B). If the finger leaves the sensing region with the triggering duration not exceeding the predetermined duration, the processing unit 110 re-executes the measuring of the input moments of the input signals in the sensing region (as shown in FIG. 2B).

In addition to switching the states, the electronic device 100 is configured to display a feedback signal by display unit 130 or by the speaker 172. For example, the processing unit 110 informs the user by the vibration of the electronic device 100 or a sound outputted by the speaker 172.

Figure 3A:
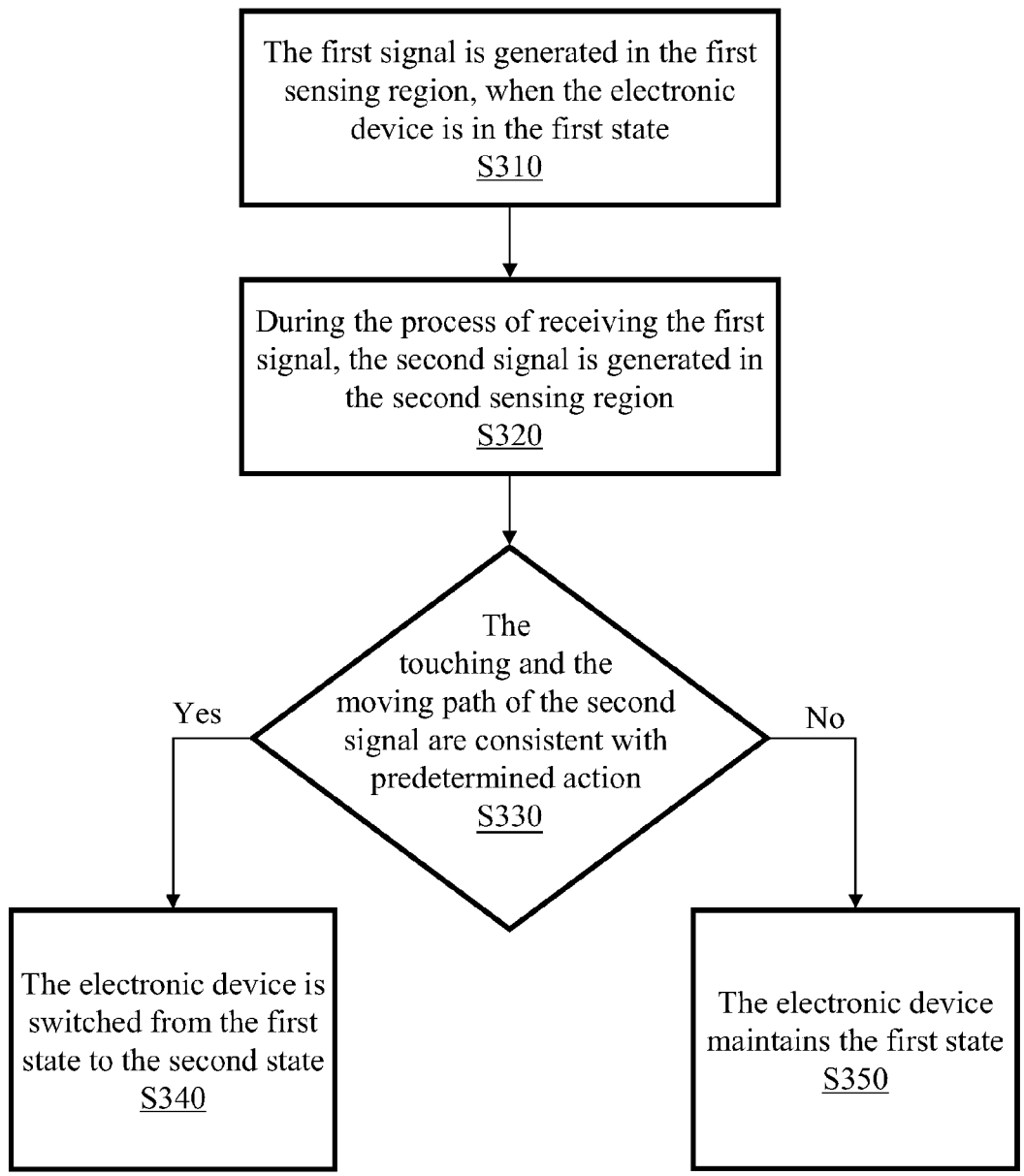
FIG. 3A is a flow chart of the switching method according to a second embodiment of the present disclosure.

Refer to FIG. 3A where the switching process according to the second embodiment in the present disclosure includes following steps. In step S310, the first signal is generated by the first sensing region when the electronic device is in the first state. In step S320, during the period in which the first signal is received, the second signal generated by the second sensing region is received. In step S330, whether the touching manner and the moving path of the second signal are consistent with a predetermined gesture are determined. In step S340, if the touching manner and the moving path of the second signal are consistent with the predetermined gesture, the electronic device is switched from the first state to the second state. In step 350, if the touching manner and the moving path of the second signal are not consistent with the predetermined gesture, the electronic device stays in the first state.

As mentioned above, in the first state, the electronic device 100 is configured to receive the first signal from the first sensing region 140 and is configured to receive the second signal from the second sensing region 150. The two signals may occur simultaneously or have an order in time. During the period in which the first signal is received, the processing unit 110 is configured to detect whether the second signal is appropriate, once the user touches the second sensing region 150. In addition to touching, the second signal may be generated by moving or clicking on the second sensing region 150.

The predetermined gesture may include various manners such as a to-and-fro movement in the second sensing region 150, touching/releasing the second sensing region 150, or moving the finger along the graphic shown in the display unit 130. In this embodiment, a reminder 311 is shown in the display unit 130. The reminder 311 can be, but not limited to, a graphic, a movie or the sound outputted by the speaker 172. In the step S330, the reminder 311 is displayed in the display unit 130, so as to display the action corresponding to the second signal. In other embodiments, the display unit 130 is configured to display the reminder 311 while the second signal is received by the processing unit 110.

Figure 3B:
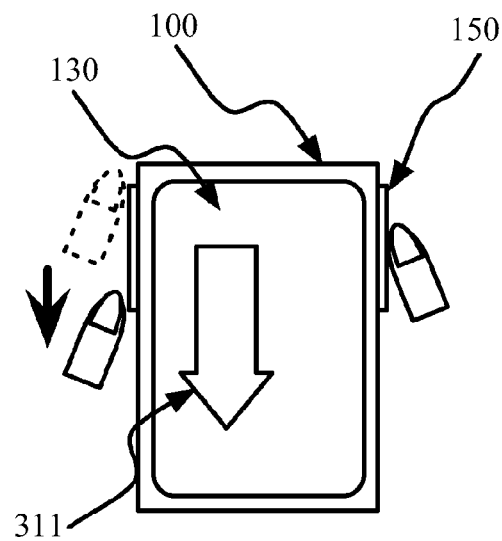
FIG. 3B shows the switching processes according to the second embodiment of the present disclosure.
Figures 1, 3C:
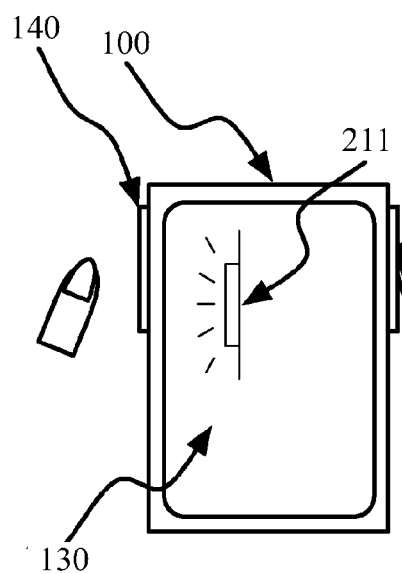
Figures 2, 3C:
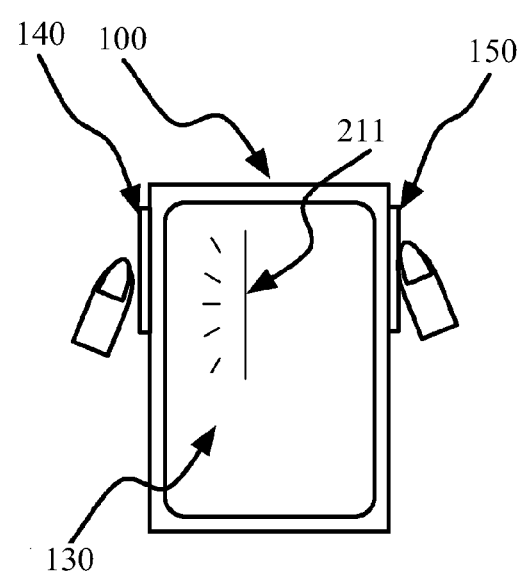

For example, the display unit 130 is shown as an arrow, referring to FIG. 3B, for guiding the user to move his finger along the direction of the arrow. As shown in FIG. 3B, the finger indicated by the dotted line is configured to show the starting position of the finger, and the fingers indicated by the solid line is configured to indicate the current position of the finger. As shown in FIG. 3C-1 and FIG. 3C-2, the display unit 130 is configured to display a reminder in order to inform the user that it is required to keep tapping on the sensing regions. Before the sensing region is touched, the display unit 130 keeps displaying the reminder 311 so as to inform the user that the sensing region is not touched yet. When the sensing region is touched, the display unit 130 shows a symbol indicating the sensing region is pressed. And the display unit 130 will display the reminder 311 continuously, until the action mentioned above is completed. In other embodiments, after the action mentioned above is completed, the display unit 130 further displays the reminder 311 for a specified period.

If the second signal is consistent with the predetermined gesture, the electronic device 100 is switched from the first state to the second state. If not, the electronic device 100 stays in the first state. When the electronic device 100 is in the first state and the action of the second signal is not consistent with the predetermined gesture, the electronic device 100 is configured to stay in the first state and re-detect the second signal.

In other embodiments, when the first sensing region 140 is touched, the processing unit 110 is configured to detect whether the second signal is received. If the first sensing region 140 and the second sensing region 150 are touched simultaneously, the processing unit 110 is configured to determine if the action of the second signal is consistent with the predetermined gesture. If an accidental touching taken by the user or an inappropriate motion taken by the others occurs, action of the second signal will be inconsistent with the predetermined gesture, and therefore, the processing unit 110 will determines that the unlock process is fail.

Figure 4:
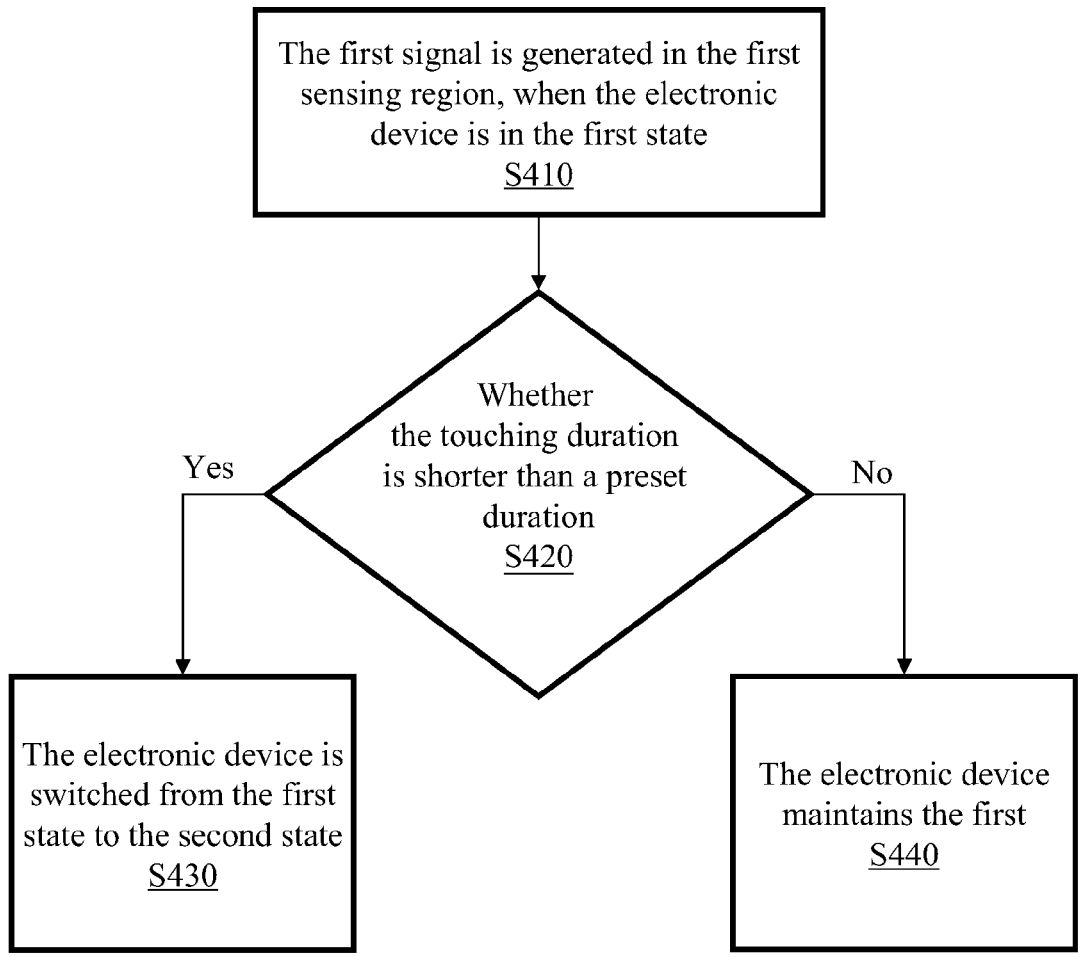
FIG. 4 is a flow chart of the switching method according to a third embodiment of the present disclosure.

In addition to the embodiments mentioned above, the switching method according to the third embodiment of the present disclosure shown in FIG. 4 comprises following steps. In step S410, the first sensing region is touched for generating the first signal, when the electronic device is in the first state. In step S420, whether the touching duration exceeds the predetermined duration is determined. In step S430, if the touching duration of the first signal exceeds or equal to the predetermined duration, the electronic device is switched from the first state to the second state. In step S440, if the touching duration does not exceed the predetermined duration, the electronic device will maintain the first state.

This embodiment provides electronic device 100 with single sensing region. When the electronic device 100 is in the first state, the processing unit 110 is configured to detect the first signals from the first sensing region 140 continuously. When the touching duration in the first sensing region 140 exceeds the predetermined duration, the processing unit 110 is switched from the first state to the second state. If the touching duration in the first sensing region 140 does not excess the predetermined duration, the electronic device 100 stays in the first state.

When the first sensing region 140 is touched, the display unit 130 shows an indication. In some embodiments, the display unit 130 shows the remaining seconds. In other embodiments, the electronic device 100 shocks by a vibrator with different intensities.

Figure 5A:
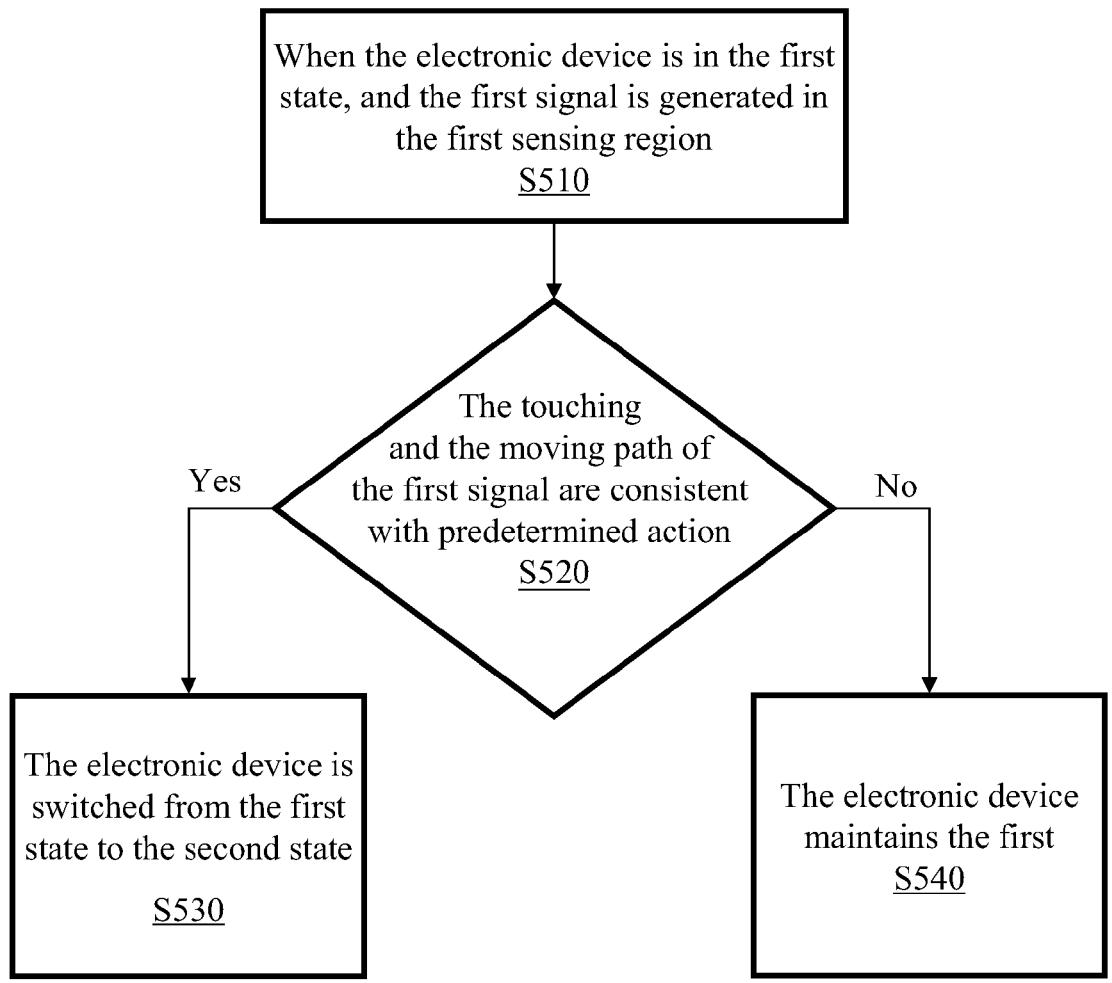
FIG. 5A is a flow chart of the switching method according to a fourth embodiment of the present disclosure.

Referring to FIG. 5A, the switching method according to the fourth embodiment of the present disclosure includes following steps. In step S510, when the electronic device is in the first state, the first sensing region is touched for generating the first signal. In step S520, whether the touching manner and the moving path of the first signal are consistent with predetermined gesture is determined. In step S530, if the first signal is consistent with the predetermined gesture, the electronic device is switched from the first state to the second state. In step S540, if the first signal is not consistent with the predetermined gesture, the electronic device stays in the first state.

The gist of this embodiment lies in the step of determining whether the touching manner is consistent with the predetermined gesture. When the electronic device 100 is in the first state and the first sensing region 140 is touched, the first sensing region 140 generates the first signal. However, the unlocking process is not performed at this time. And the processing unit 110 is receives the first signal continuously, while the finger is moving. Furthermore, the processing unit 110 determines the position where the first signal generates, based on the touching position in the first sensing region 140. Accordingly, in this embodiment, the processing unit 110 is configured to take comparison between the moving path of the first signal and the predetermined gesture.

Figures 1, 5B:
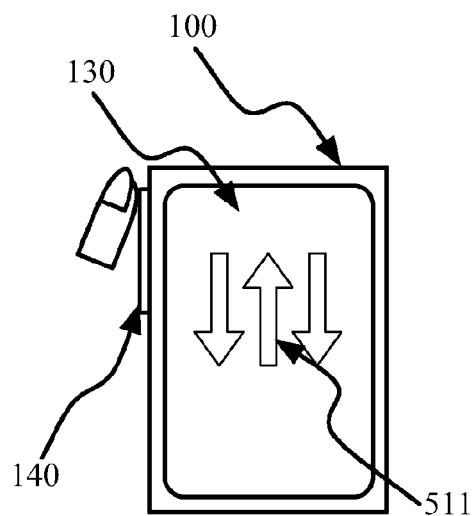
Figures 2, 5B:
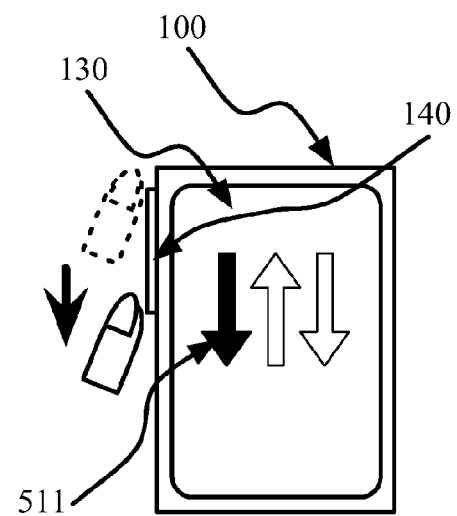
Figures 3, 5B:
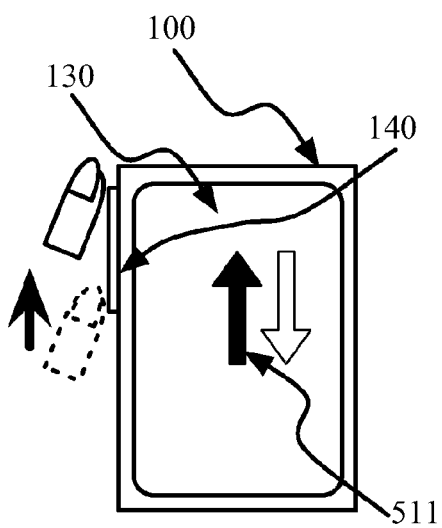
Figures 4, 5B:
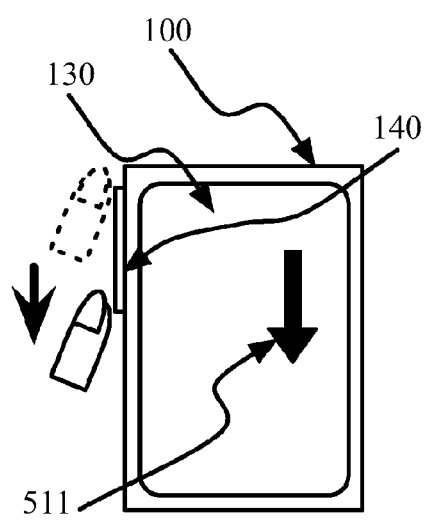

In the present disclosure, the predetermined gesture is, for example, predetermined by the user or displayed randomly in the display unit 130. In an embodiment as shown in FIG. 5B-1 and FIG. 5B-4, the display unit 130 shows a predetermined path having a shape three parallel lines (i.e., the indications 511 as mentioned above). At this time, the user may touch the first sensing region 140 and move his finger up and downs in the first sensing region 140 along the predetermined path. In this embodiment, the way that the finger moves is shown in FIGS. 5B-1 and 5B-2. In FIGS. 5B-1 and 5B-2, the finger moves from the top of the first sensing region 140 to the bottom of the same. Referring to FIG. 5B-2, the reminders 511 shown in the display unit 130 are configured to be changed with the movement of the finger. Specifically, as soon as the finger finishes the left most line of the predetermined path, the color of one of the reminders 511 is changed. In FIG. 5B-2, the dotted line indicates a start position of the finger, and the solid line indicates a stop position of the finger. Then, the finger moves upwards from the lower position of the first sensing region 140 shown in FIG. 5B-2 to an upper position of the first sensing region 140 shown in FIG. 5B-3. Then, the finger moves downwards again from the upper position of the first sensing region 140 to the lower position of the first sensing region 140, as shown in FIG. 5B-4. If the first signal is consistent with the predetermined gesture, the electronic device 100 will be switched from the first state to the second state. If the first signal is not consistent with the first predetermined gesture, the electronic device 100 will maintain the first state.

Figure 6A:
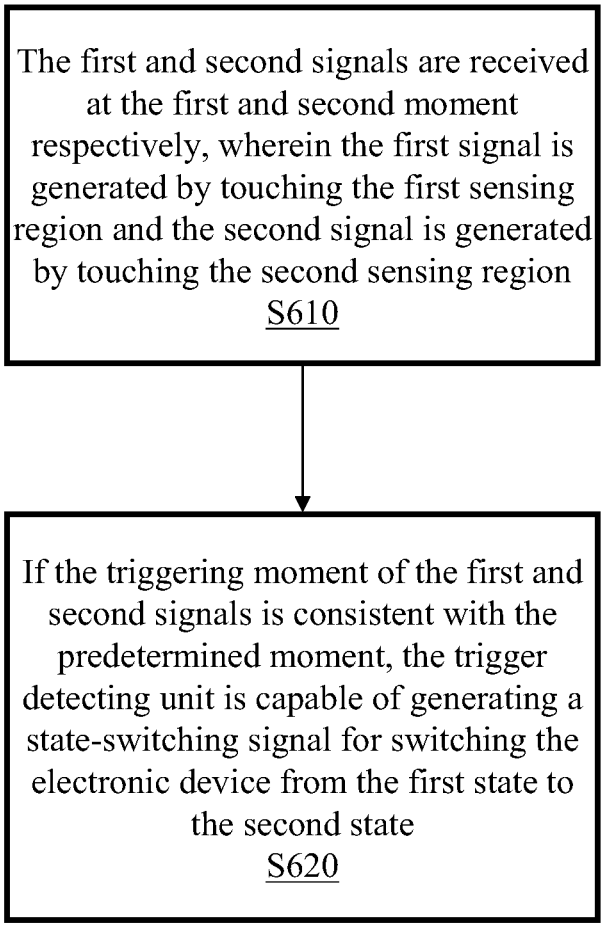
FIG. 6A is a flow chart of the switching method according to a fifth embodiment of the present disclosure.
Figure 6B:
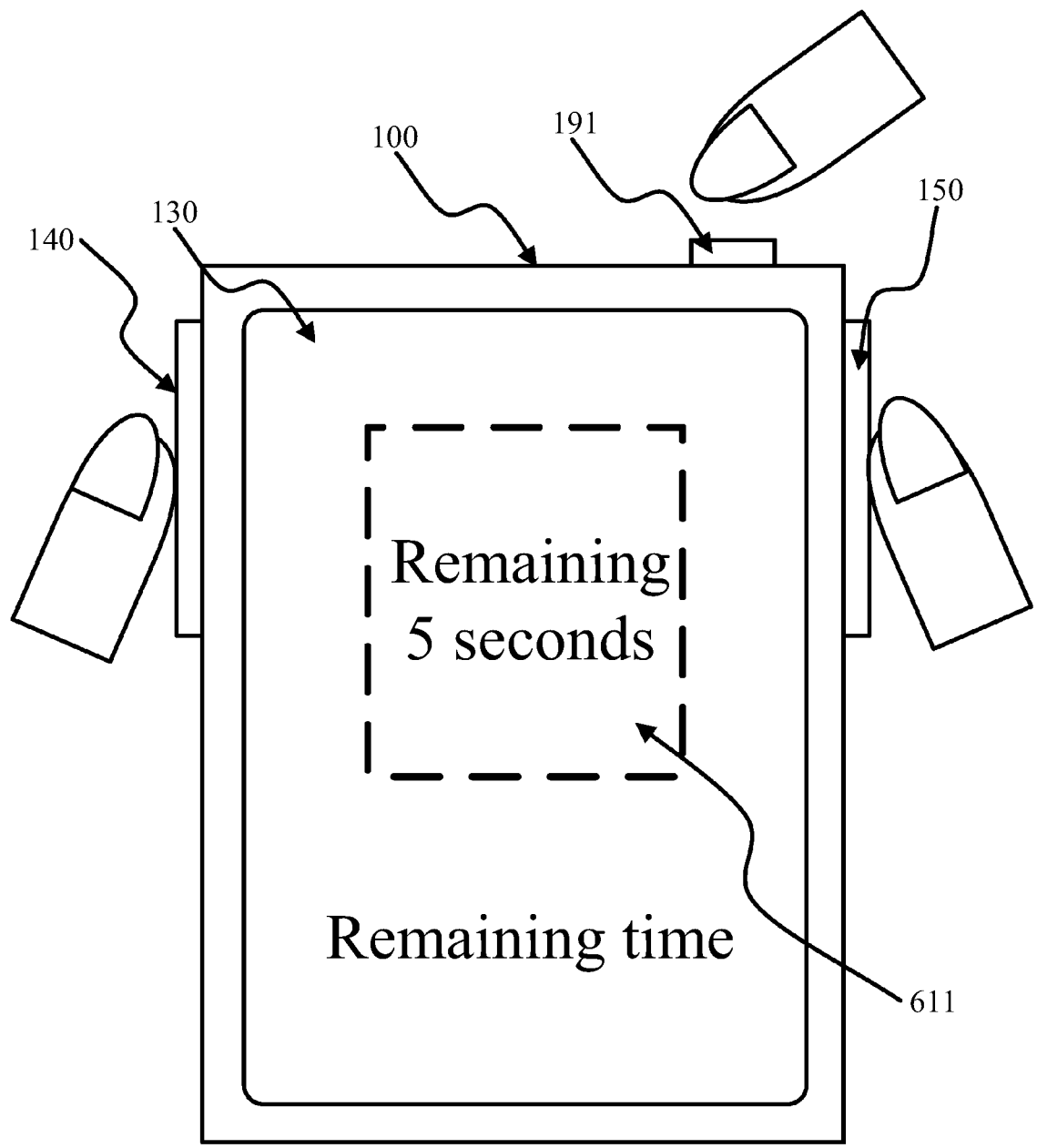
FIG. 6B shows the electronic device according to the fifth embodiment of the present disclosure.

Referring to FIGS. 6A-6B, the switching method according to the fifth embodiment in the present disclosure comprises the following steps. In Step S610, the first and second signals are received at the first and second moments respectively, wherein the first signal is generated by touching the first sensing region and the second signal is generated by touching the second sensing region. In Step S620, if the triggering moment determined by the first and second signals is consistent with the predetermined moment, the trigger detecting unit is configured to generate a state-switching signal, so as to switch the electronic device from the first state to the second state.

In this embodiment, the processing unit 110 is configured to receive the first signal, the second signal and the signal send by the detecting unit. Specifically, the processing unit 110 receives the first and second signals at the first and second moments, respectively. Then, the processing unit 110 measures the triggering duration in which the first and second signals exist simultaneously. If the triggering duration exceeds the predetermined duration, the processing unit 110 detects the signal send out from the detecting unit 190 in the triggering process.

For detailing the detecting processes of the different detecting unit, the different types of the detecting unit will be described as follows. In one embodiment, the detecting unit is a switch 191 such as a power switch. Actually, ways of detecting signal send out from the switch 191 is, for example, based on the position of the switch 191 in the electronic device 100. Before the switch 191 is pushed, the display unit 130 configured to display the indication 611 which shows the time required for pressing, as shown in FIG. 6B. When the triggering duration exceeds the predetermined duration and the switch 191 is pressed, the processing unit 110 is switched from the first state to the second state. Then, the display unit 130 displays the pressing duration indicating the period that the switch 191 has been pressed. If the switch 191 or the sensing region is released within the predetermined duration, the processing unit 110 cancels the unlocking process.

Figures 1, 6C:
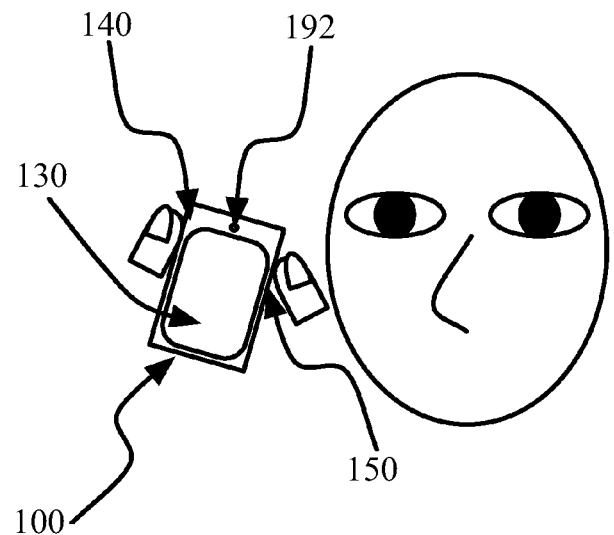
Figures 2, 6C:
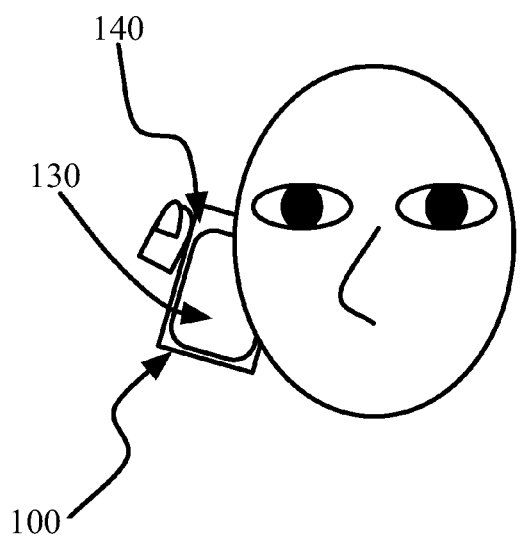

The detecting unit 190 may be an optical sensor. The optical sensor is configured to detect the changes of the ambient light and is configured to determine whether to send the state-switching signal according to the changes. Referring to FIG. 6C-1, the fingers touch the first sensing region 140 and the second sensing region 150 respectively. At this time, because the optical sensor 192 of the electronic device 100 is far away from the user, the optical sensor 192 can not detect the changes of the brightness. As the electronic device 100 is getting closer to the user's face (referring to FIG. 6C-2), the optical sensor 192 detects the decreasing of the brightness. When the electronic device gets close to the user's face, the fingers touch the first sensing region 140 and second sensing region 150. Therefore, the optical sensor 192 is capable of sending the state switching signal to the processing unit 110, and thus the processing unit 110 is switched from the first state to the second state.

Figures 1, 6D:
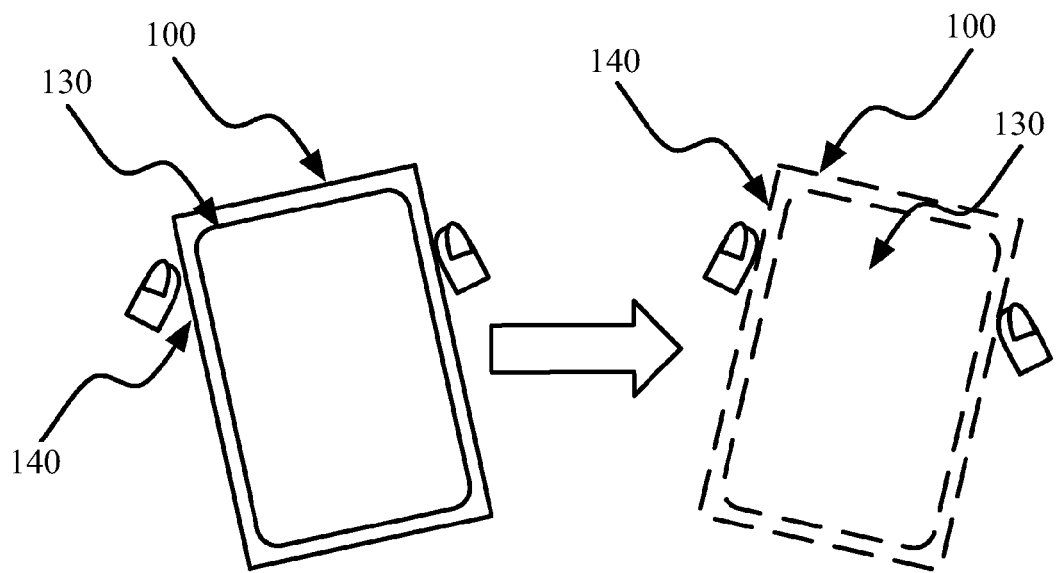
Figures 2, 6D:
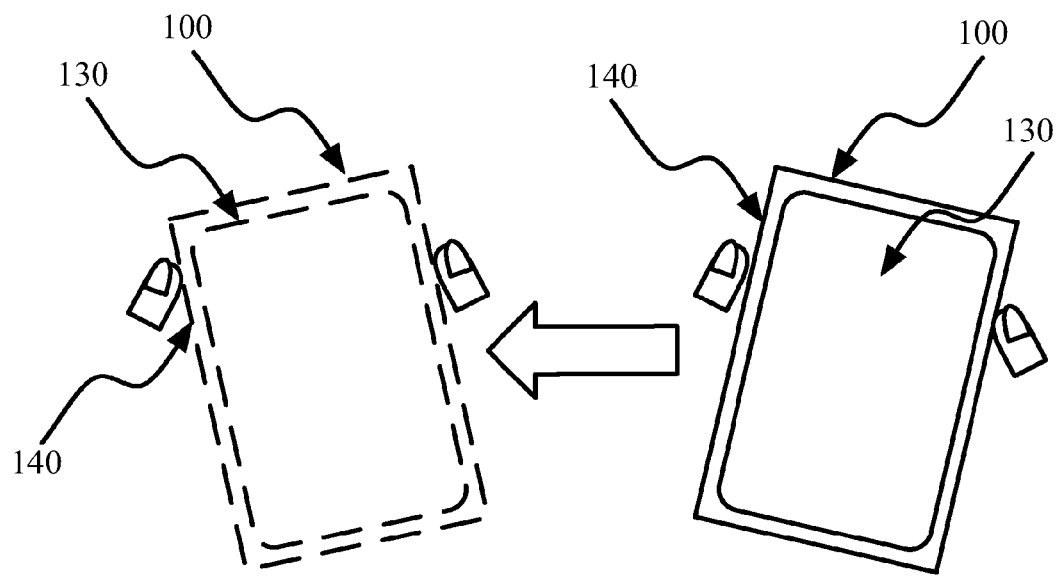

According to some embodiments of the present disclosure, an accelerometer is used to detect the alterations of the ambient. Referring to FIG. 6D-1, the electronic device 100 has a built-in accelerometer, and therefore it is unnecessary to make additional label in the figures. The user may touches the first sensing region 140 and second sensing region 150 firstly, and then shake the electronic device in the direction as shown in FIGS. 6D-1 and 6D-2. In these embodiments, the start position and the stop position of the motion of shaking are respectively indicated by dotted line and solid line in the figures. Furthermore, the display unit 130 is configured to show the direction, strength or frequency required in the shaking process, so as to remind the user whether the conditions for unlocking is satisfied.

The present disclosure provides a state-switching method for the electronic device 100, so as to implement a rapid switching form the locking state (or the sleep state) to the operating state. Therefore, the switching of the states is configured to be implemented by the touching (or other types of action) in/on the different sensing regions.

What is claimed is:
1. A switching method for an electronic device having a plurality of sensing regions, the switching method being configured to switch states of the electronic device and comprising:
(a) generating a first signal by touching a first sensing region, when the electronic device is in a first state;
(b) displaying at least one indication for a predetermined gesture on a display unit of the electronic device;
(c) generating a second signal by touching a second sensing region, wherein the first sensing region and the second sensing region are disposed on at least one of the sides of the electronic device except the side that a display unit of the electronic device is configured on, the at least one indication changes with the second signal;
(d) determining whether a touching manner and a moving path of the second signal are consistent with the predetermined gesture when receiving the second signal during a period in which the first signal has been received;
(e) switching the electronic device from the first state to a second state when the second signal is consistent with the predetermined gesture and when the first signal has been received; and
(f) maintaining the electronic device in the first state when the second signal is not consistent with the predetermined gesture or when the first signal has not been received;
wherein the first state is a locked state or a sleep state, and the second state is an unlocked state, the touch display panel of the electronic device is locked in the locked state or the sleep state, the touch display panel of the electronic device is unlocked in the unlocked state.

2. The switching method according to claim 1, wherein the at least one indication is a movie, a graphic an animation or a sound.

3. The switching method according to claim 1, further comprising:
- re-executing the steps (a) to (d), when the electronic device being in the first state and the second signal being not consistent with the predetermined gesture.

4. An electronic device, comprising:
- a first sensing region configured to generate a first signal when the first sensing region is touched;
- a second sensing region configured to generate a second signal when the second sensing region is touched;
- at least one processing unit electrically connected to the first sensing region and the second sensing region, the processing unit being configured to determine whether to switch the electronic device from a first state to a second state according to the first signal and the second signal; and
- a display unit configured to display at least one indication for a predetermined gesture;
- when the processing unit is in the first state, the processing unit being configured to receive the first signal generated from the first region, being configured to receive the second signal generated from the second region after the display unit displays the at least one indication and being configured to determine whether a touching manner and a moving path of the second signal are consistent with the predetermined gesture when the second signal is received during a period in which the first signal has been received, and when the second signal is consistent with the predetermined gesture and the electronic device being switched from the first state to the second state when the first signal has been received;
- wherein the first sensing region and the second sensing region are disposed on at least one of the sides of the electronic device except the side that a display unit of the electronic device is configured on, the at least one indication changes with the second signal;
- wherein the first state is a locked state or a sleep state, and the second state is an unlocked state, the touch display panel of the electronic device is locked in the locked state or the sleep state, the touch display panel of the electronic device is unlocked in the unlocked state.

5. The electronic device according to claim 4, wherein the at least one indication is a movie, a graphic or an animation.

6. The electronic device according to claim 4, wherein when the electronic device is in the first state and the second signal is not consistent with the predetermined-gesture, the electronic device is configured to detect the second signal in the first state.

* * * * *